(12) United States Patent
Kijima et al.

(10) Patent No.: US 8,012,449 B2
(45) Date of Patent: Sep. 6, 2011

(54) METHOD OF MANUFACTURING COMPLEX METAL OXIDE POWDER AND AMORPHOUS COMPLEX METAL OXIDE

(75) Inventors: Takeshi Kijima, Matsumoto (JP); Hidemichi Furihata, Chino (JP); Setsuya Iwashita, Nirasaki (JP); Satoshi Kimura, Fujimi (JP); Toshihiko Kaneda, Hakusan (JP)

(73) Assignee: Seiko Epson Corporation (JP)

( * ) Notice: Subject to any disclaimer, the term of this patent is extended or adjusted under 35 U.S.C. 154(b) by 549 days.

(21) Appl. No.: 11/821,882

(22) Filed: Jun. 26, 2007

(65) Prior Publication Data
US 2008/0003161 A1 Jan. 3, 2008

(30) Foreign Application Priority Data

Jun. 28, 2006 (JP) ................................. 2006-177788
Apr. 26, 2007 (JP) ................................. 2007-117642

(51) Int. Cl.
| | |
|---|---|
| C01G 25/02 | (2006.01) |
| C01G 23/04 | (2006.01) |
| C01G 27/02 | (2006.01) |
| C01G 21/02 | (2006.01) |
| C01G 31/02 | (2006.01) |
| C01G 33/00 | (2006.01) |
| C01G 35/00 | (2006.01) |
| C01G 41/02 | (2006.01) |
| H01L 41/18 | (2006.01) |

(52) U.S. Cl. ......... 423/593.1; 252/62.9 R; 252/62.9 PZ; 423/594.8; 423/594.12; 423/594.13; 423/595

(58) Field of Classification Search ................. 423/598, 423/594.8, 594.12, 594.9, 594.13
See application file for complete search history.

(56) References Cited

U.S. PATENT DOCUMENTS

| | | | | |
|---|---|---|---|---|
| 4,061,583 | A | * | 12/1977 | Murata et al. .......... 252/62.3 BT |
| 5,908,802 | A | * | 6/1999 | Voigt et al. .................... 501/134 |
| 7,037,731 | B2 | | 5/2006 | Kijima et al. |
| 7,255,941 | B2 | | 8/2007 | Kijima et al. |
| 7,371,473 | B2 | | 5/2008 | Kijima et al. |
| 2004/0214352 | A1 | | 10/2004 | Kijima et al. |

(Continued)

FOREIGN PATENT DOCUMENTS

| | | |
|---|---|---|
| CN | 1532917 | 9/2004 |
| DE | 195 15 820 | 10/1996 |
| EP | 1602636 | 12/2005 |

(Continued)

*Primary Examiner* — Wayne Langel
*Assistant Examiner* — Syed Iqbal
(74) *Attorney, Agent, or Firm* — Harness, Dickey & Pierce, P.L.C.

(57) ABSTRACT

A method of manufacturing a complex metal oxide powder, the method including: preparing a raw material composition for forming a complex metal oxide; mixing an oxidizing solution including an oxidizing substance into the raw material composition to produce complex metal oxide particles to obtain a liquid dispersion of the particles; and separating the particles from the liquid dispersion to obtain a complex metal oxide powder. The complex metal oxide is shown by a general formula $AB_{1-x}C_xO_3$, an element A including at least Pb, element B including at least one of Zr, Ti, V, W, and Hf, and an element C including at least one of Nb and Ta. The raw material composition includes: at least one of a thermally-decomposable organometallic compound including the element A, the element B, or the element C, a hydrolyzable organometallic compound including the element A, the element B, or the element C, and a partial hydrolyzate and/or a polycondensate of the hydrolyzable organometallic compound; at least one of a polycarboxylic acid and a polycarboxylic acid ester; and an organic solvent.

10 Claims, 3 Drawing Sheets

U.S. PATENT DOCUMENTS

| | | |
|---|---|---|
| 2005/0020699 A1 | 1/2005 | Isobe et al. |
| 2005/0271823 A1* | 12/2005 | Kijima et al. ............ 427/376.6 |
| 2006/0062723 A1 | 3/2006 | Noguchi |
| 2006/0088731 A1 | 4/2006 | Kijima et al. |
| 2007/0119343 A1 | 5/2007 | Kijima et al. |

FOREIGN PATENT DOCUMENTS

| | | |
|---|---|---|
| JP | 07-069645 | 3/1995 |
| JP | 08-277113 | 10/1996 |
| JP | 2005-290494 | 10/2005 |
| JP | 2007-145672 | 6/2007 |

* cited by examiner

METHOD OF MANUFACTURING COMPLEX METAL OXIDE POWDER AND AMORPHOUS COMPLEX METAL OXIDE

Japanese Patent Application No. 2006-177788, filed on Jun. 28, 2006, and Japanese Patent Application No. 2007-117642, filed on Apr. 26, 2007, are hereby incorporated by reference in their entirety.

BACKGROUND OF THE INVENTION

The present invention relates to a method of manufacturing a complex metal oxide powder and an amorphous complex metal oxide powder obtained by this manufacturing method.

A coprecipitation method is known as a method of producing a complex metal oxide powder. For example, JP-A-8-277113 discloses a method of manufacturing a lead zirconate titanate powder using a coprecipitation method. In this manufacturing method, hydrogen peroxide is used as a masking agent (solution stabilizer). The addition of such a masking agent to each of a zirconium solution and a titanium solution allows zirconium and titanium ion complexes to be produced and the ionic concentration-pH curve to move toward a required pH range, whereby lead zirconate titanate with a uniform composition is produced. According to the above coprecipitation method, since it is necessary to prepare solutions by adding hydrogen peroxide to the zirconium solution and the titanium solution, solution preparation is complicated. Moreover, the above method has a problem such as a low precipitation rate.

SUMMARY

According to a first aspect of the invention, there is provided a method of manufacturing a complex metal oxide powder, the method comprising:
preparing a raw material composition for forming a complex metal oxide;
mixing an oxidizing solution including an oxidizing substance into the raw material composition to produce complex metal oxide particles to obtain a liquid dispersion of the particles; and
separating the particles from the liquid dispersion to obtain a complex metal oxide powder;
the complex metal oxide being shown by a general formula $AB_{1-x}C_xO_3$, an element A including at least Pb, an element B including at least one of Zr, Ti, V, W, and Hf, and an element C including at least one of Nb and Ta; and
the raw material composition including:
at least one of a thermally-decomposable organometallic compound including the element A, the element B, or the element C, a hydrolyzable organometallic compound including the element A, the element B, or the element C, and a partial hydrolyzate and/or a polycondensate of the hydrolyzable organometallic compound;
at least one of a polycarboxylic acid and a polycarboxylic acid ester; and
an organic solvent.

According to a second aspect of the invention, there is provided an amorphous complex metal oxide powder obtained by the above-described method,
the amorphous complex metal oxide powder being shown by a general formula $AB_{1-x}C_xO_3$, an element A including at least Pb, an element B including at least one of Zr, Ti, V, W, and Hf, and an element C including at least one of Nb and Ta.

DETAILED DESCRIPTION OF THE EMBODIMENT

The invention may provide a method of manufacturing a complex metal oxide powder using a very simple technique, and an amorphous complex metal oxide powder obtained by the manufacturing method.

According to one embodiment of the invention, there is provided a method of manufacturing a complex metal oxide powder, the method comprising:
preparing a raw material composition for forming a complex metal oxide;
mixing an oxidizing solution including an oxidizing substance into the raw material composition to produce complex metal oxide particles to obtain a liquid dispersion of the particles; and
separating the particles from the liquid dispersion to obtain a complex metal oxide powder;
the complex metal oxide being shown by a general formula $AB_{1-x}C_xO_3$, an element A including at least Pb, an element B including at least one of Zr, Ti, V, W, and Hf, and an element C including at least one of Nb and Ta; and
the raw material composition including:
at least one of a thermally-decomposable organometallic compound including the element A, the element B, or the element C, a hydrolyzable organometallic compound including the element A, the element B, or the element C, and a partial hydrolyzate and/or a polycondensate of the hydrolyzable organometallic compound;
at least one of a polycarboxylic acid and a polycarboxylic acid ester; and
an organic solvent.

According to the method of manufacturing a complex metal oxide of this embodiment, a complex metal oxide powder with excellent properties can be obtained by using a simple technique.

In this method of manufacturing a complex metal oxide powder, the complex metal oxide may be lead zirconate titanate niobate in which the element B is Zr and Ti and the element C is Nb.

In this method of manufacturing a complex metal oxide powder, the organic solvent may be an alcohol.

In this method of manufacturing a complex metal oxide powder, the lead zirconate titanate niobate may be shown by a formula $Pb(Zr,Ti)_{1-x}Nb_xO_3$ in which $0.05 \leq x \leq 0.3$.

In this method of manufacturing a complex metal oxide powder, the lead zirconate titanate niobate may further include silicon or silicon and germanium in an amount of 0.5 mol % or more.

In this method of manufacturing a complex metal oxide powder, the pH of the oxidizing solution may be adjusted preferably to more than 7 and 13 or less, more preferably to 10 or more and 13 or less, and further preferably to 10 or more and 11 or less.

In this method of manufacturing a complex metal oxide powder, the oxidizing solution may be obtained by mixing a solution of an oxidizing substance and a solution of an alkaline substance.

In this method of manufacturing a complex metal oxide powder, the oxidizing substance may be hydrogen peroxide.

In this method of manufacturing a complex metal oxide powder, the complex metal oxide may be amorphous.

According to one embodiment of the invention, there is provided an amorphous complex metal oxide powder obtained by the above-described method, the amorphous complex metal oxide powder being shown by a general formula $AB_{1-x}C_xO_3$, an element A including at least Pb, an element B including at least one of Zr, Ti, V, W, and Hf, and an element C including at least one of Nb and Ta.

The embodiments of the invention will be described in detail below, with reference to the drawings.

1. METHOD OF MANUFACTURING COMPLEX META OXIDE POWDER

A method of manufacturing a complex metal oxide powder according to one embodiment of the invention at least includes preparing a raw material composition for forming a complex metal oxide, mixing an oxidizing substance into the raw material composition to produce complex metal oxide particles to obtain a liquid dispersion of the particles, and separating the particles from the liquid dispersion to obtain a complex metal oxide powder.

The manufacturing method according to this embodiment may include the following steps.

(1) Preparation of Raw Material Composition

The raw material composition according to this embodiment is used to produce a complex metal oxide powder. The complex metal oxide may be shown by the general formula $AB_{1-x}C_xO_3$, wherein the element A may include at least Pb, the element B may include at least one of Zr, Ti, V, W, and Hf, and the element C may include at least one of Nb and Ta.

The raw material composition includes at least one of a thermally-decomposable organometallic compound including the element A, the element B, or the element C, a hydrolyzable organometallic compound including the element A, the element B, or the element C, and a partial hydrolyzate and/or a polycondensate thereof, at least one of a polycarboxylic acid and a polycarboxylic acid ester, and an organic solvent.

The raw material composition may be prepared by mixing organometallic compounds respectively including the constituent metal of the material for the complex metal oxide or a partial hydrolyzate and/or a polycondensate thereof so that the metals are contained at a desired molar ratio, and dissolving or dispersing the components using an organic solvent such as an alcohol. It is preferable to use an organometallic compound which is stable in a solution state.

An organometallic compound which can be used according to this embodiment is an organometallic compound which can produce a metal oxide originating in the organometallic compound upon hydrolysis or oxidation. The organometallic compound is selected from an alkoxide, an organic metal complex, an organic acid salt, and the like of each metal.

As the thermally-decomposable organometallic compounds respectively containing the constituent metal of the complex metal oxide, organometallic compounds such as a metal alkoxide, an organic acid salt, and a beta-diketone complex may be used. As the hydrolyzable organometallic compounds respectively containing the constituent metal of the complex metal oxide, organometallic compounds such as a metal alkoxide may be used. Examples of the organometallic compounds include the following compounds.

As examples of the organometallic compound including Zr, Ti, V, W, or Hf (element B), an alkoxide, acetate, octylate, and the like of these elements can be given.

As examples of the organometallic compound including Pb (element A), lead acetate and lead octylate can be given.

As examples of the organometallic compound including Nb (element C), niobium octylate and lead octylate niobate can be given. Niobium octylate has a structure in which two Nb atoms form a covalent bond and an octyl group exists in the remaining site. As an example of the organometallic compound including Ta (element C), tantalum octylate can be given.

In the raw material composition according to this embodiment, an alcohol may be used as the organic solvent. Use of an alcohol as the solvent allows the organometallic compounds and the polycarboxylic acid or the polycarboxylic acid ester to be advantageously dissolved. The alcohol is not particularly limited. Monohydric alcohols such as butanol, methanol, ethanol, and propanol, and polyhydric alcohols can be given as examples of the alcohol. As examples of such alcohols, the following compounds can be given.

Monohydric alcohol:

Propanol (propyl alcohol): 1-propanol (boiling point: 97.4° C.) and 2-propanol (boiling point: 82.7° C.)

Butanol (butyl alcohol): 1-butanol (boiling point: 117° C.), 2-butanol (boiling point: 100° C.), 2-methyl-1-propanol (boiling point: 108° C.), and 2-methyl-2-propanol (melting point: 25.4° C., boiling point: 83° C.)

Pentanol (amyl alcohol): 1-pentanol (boiling point: 137° C.), 3-methyl-1-butanol (boiling point: 131° C.), 2-methyl-1-butanol (boiling point: 128° C.), 2,2-dimethyl-1-propanol (boiling point: 113° C.), 2-pentanol (boiling point: 119° C.), 3-methyl-2-butanol (boiling point: 112.5° C.), 3-pentanol (boiling point: 117° C.), and 2-methyl-2-butanol (boiling point: 102° C.)

Polyhydric alcohol:

Ethylene glycol (melting point: −11.5° C., boiling point: 197.5° C.) and glycerol (melting point: 17° C., boiling point: 290° C.)

In the raw material composition according to the invention, the polycarboxylic acid or the polycarboxylic acid ester may be a carboxylic acid or a carboxylic acid ester having two or more carboxyl groups. As examples of the polycarboxylic acid used in the invention, the following compounds can be given. As examples of a tricarboxylic acid, trans-aconitic acid, trimesic acid, and the like can be given. As examples of a tetracarboxylic acid, pyromellitic acid, 1,2,3,4-cyclopentanetetracarboxylic acid, and the like can be given. As examples of the polycarboxylic acid ester, dicarboxylic acid esters such as dimethyl succinate, diethyl succinate, dibutyl oxalate, dimethyl malonate, dimethyl adipate, dimethyl maleate, and diethyl fumarate, tricarboxylic acid esters such as tributyl citrate and triethyl 1,1,2-ethanetricarboxylate, tetracarboxylic acid esters such as tetraethyl 1,1,2,2-ethanetetracarboxylate and trimethyl 1,2,4-benzenetricarboxylate, and the like can be given.

In the raw material composition according to the invention, the dicarboxylic acid ester may be preferably at least one compound selected from a succinic acid ester, a maleic acid ester, and a malonic acid ester. As specific examples of these esters, dimethyl succinate, dimethyl maleate, and dimethyl malonate can be given.

The polycarboxylic acid or the polycarboxylic acid ester may have a boiling point higher than that of the organic solvent. If the polycarboxylic acid or the polycarboxylic acid ester has a boiling point higher than that of the organic solvent, the reaction of the raw material composition can proceed more promptly, as described later.

The polycarboxylic acid ester may have a molecular weight of 150 or less. If the molecular weight of the polycarboxylic acid ester is too high, the resulting film may be damaged when the ester volatilizes during heat treatment, whereby a dense film may not be obtained.

The polycarboxylic acid ester may be liquid at room temperature. If the polycarboxylic acid ester is solid at room temperature, gelation may occur.

A complex metal oxide obtained using the raw material composition according to this embodiment may include Nb in the range of preferably $0.05 \leq x < 1$, and still more preferably $0.1 \leq x \leq 0.3$. The complex metal oxide may include Si or Si and Ge in an amount of preferably 0.5 mol % or more, and still more preferably 0.5 mol % or more and 5 mol % or less. The element B may be Zr and Ti. Specifically, the complex metal oxide according to this embodiment may be $Pb(Zr,Ti,Nb)O_3$ (PZTN) in which the Ti site is doped with Nb.

Nb has an atomic size approximately equal to that of Ti (i.e. Nb and Ti have similar ionic radii and have the same atomic radius) and has an atomic weight twice the atomic weight of Ti. Therefore, Nb is not easily released from the lattice even if a collision occurs between atoms due to a lattice vibration. Since Nb is stable at a valence of +5, the valence of Pb can be compensated for by $Nb^{5+}$ even if Pb is released. Moreover, even if Pb is released during crystallization, it is easier for Nb with a small atomic size to enter the lattice than for O with a large atomic size to be released.

Since $Nb^{4+}$ also exists, Nb can replace $Ti^{4+}$. In addition, it is considered that Pb is not easily released due to the very strong covalent bonding properties of Nb (H. Miyazawa, E. Natori, S. Miyashita; Jpn. J. Appl. Phys. 39 (2000) 5679).

Since the complex metal oxide (particularly PZTN) obtained using the raw material composition according to this embodiment includes a specific amount of Nb, the complex metal oxide exhibits excellent composition controllability due to the absence of adverse effects of Pb deficiency. As a result, PZTN exhibits excellent hysteresis characteristics, leakage characteristics, reduction resistance, piezoelectricity, insulating properties, and the like in comparison with PZT (see Japanese Patent Application No. 2005-344700, for example).

Nb has been doped into PZT mainly in the Zr-rich rhombohedral region. However, the amount of doping is as small as about 0.2 to 0.025 mol % (J. Am. Ceram. Soc, 84 (2001) 902; Phys. Rev. Let, 83 (1999) 1347). This is because the crystallization temperature is increased when adding a large amount of Nb (e.g. the crystallization temperature is increased to 800° C. or more when adding Nb in an amount of 10 mol %).

According to this embodiment, the crystallization energy of PZTN can be reduced by incorporating Si or Si and Ge in the complex metal oxide in an amount of 0.5 to 5 mol %, for example. Specifically, when using PZTN as the material for the complex metal oxide, the crystallization temperature of PZTN can be reduced by adding Si or Si and Ge in addition to Nb. The inventors of the invention have confirmed that Si partially forms the crystal as the A-site ion after functioning as a sintering agent. Specifically, when adding Si to lead titanate, a change occurred in the Raman vibration mode E (1TO) of the A-site ion. A change in Raman vibration mode was observed when adding Si in an amount of 8 mol % or less.

Therefore, it was confirmed that Si exists in the A site of the perovskite when adding a specific amount of Si.

In the invention, Ta may be used instead of Nb, or may be used together with Nb. Ta shows a tendency similar to that of Nb.

The amount of the polycarboxylic acid or the polycarboxylic acid ester used varies depending on the composition of the complex metal oxide. For example, the total molar ionic concentration of the metals for forming the complex metal oxide and the molar ionic concentration of the polycarboxylic acid (ester) may be preferably set at $1 \geq$ (molar ionic concentration of polycarboxylic acid (ester))/(total molar ionic concentration of metals in raw material solution).

The number of moles of the polycarboxylic acid or the polycarboxylic acid ester used herein refers to the number of carboxyl groups. Specifically, when using a dicarboxylic acid or a dicarboxylic acid ester, the ratio is 1:1 when the amount of dicarboxylic acid or dicarboxylic acid ester is 0.5 mol for 1 mol of metals in the raw material solution.

(2) Preparation of Oxidizing Solution

An oxidizing solution including an oxidizing substance is prepared. The oxidizing solution includes at least an oxidizing substance. The oxidizing solution may be obtained by mixing a solution of an oxidizing substance, a solution of an alkaline substance (hereinafter may be called "alkaline solution"), and a solvent such as water optionally used, for example. As the solvent for the solution of an oxidizing substance, the alkaline solution, and the oxidizing solution, water, a mixed liquid of water and an alcohol, or the like may be used. The oxidizing solution is prepared to have a pH of preferably more than 7 and 13 or less, more preferably 10 or more and 13 or less, and still more preferably 10 or more and 11 or less by adding the alkaline solution.

As the oxidizing substance (acidic substance), hydrogen peroxide, an organic acid such as citric acid, an inorganic acid such as hydrochloric acid, or the like may be used. Hydrogen peroxide is preferably used as the oxidizing substance. Hydrogen peroxide allows the complex metal oxide particles to be produced in a short period of time due to a high rate of oxidation.

As the alkaline substance, a known alkaline substance may be used. As the alkaline substance, ammonia, dimethylaminomethanol, diethylaminomethanol, dimethylaminoethanol, diethylaminoethanol, or the like may be used.

Formation of pyrochlore, which is formed when crystallizing the complex metal oxide powder, can be reduced by adjusting the pH of the oxidizing solution to the above value, whereby a crystal can be obtained which exhibits excellent reproducibility in terms of the composition ratio and the like. When using hydrogen peroxide as the oxidizing substance, the alkaline substance functions as a catalyst for hydrogen peroxide.

Amorphous complex metal oxide particles are more stably produced with high reproducibility in the subsequent mixing step (3) by using the oxidizing solution which is prepared by mixing the oxidizing substance and the alkaline substance and of which the pH is adjusted to a specific value.

(3) Mixing Raw Material Composition and Oxidizing Solution

The oxidizing solution adjusted to the specific pH obtained in (2) is mixed with the raw material composition. When adding the oxidizing solution to the raw material composition, amorphous complex metal oxide particles are produced.

For example, when adding the oxidizing solution to the PZTN raw material composition, a liquid dispersion is obtained in which amorphous PZTN (alpha-PZTN) particles are precipitated. For example, complex metal oxide particles are produced in a short time of several seconds when adding the oxidizing solution using hydrogen peroxide as the oxidizing substance.

The amount of the oxidizing solution used is appropriately selected depending on the concentration of the oxidizing substance, the pH of the oxidizing solution, and the like. For example, the oxidizing solution may be used in an amount of preferably 100 vol % to 1000 vol %, and more preferably 200 vol % to 600 vol % of the raw material composition.

(4) Collection of Particles

The particles are collected from the complex metal oxide particle liquid dispersion obtained in (3) and dried. A complex metal oxide powder is obtained by this step. As the method of collecting the particles, a known method of separating a solid from a liquid such as filtration may be used. The particles thus obtained have a particle diameter of 10 nm to 500 nm, for example, although the particle diameter varies depending on the conditions.

For example, when using the PZTN raw material composition, an alpha-PZTN powder is obtained. The alpha-PZTN powder may be directly used as a sintered material. If necessary, the alpha-PZTN powder may be ground.

This embodiment may be modified as follows.

In the step (3), the oxidizing solution is used which is prepared by mixing the oxidizing substance and the alkaline substance and of which the pH is adjusted in the step (2). Note that the mixing method of the raw material composition and the oxidizing substance is not limited thereto. For example, the alkaline solution and an optional solvent such as water may be added to the raw material composition to adjust the pH of the mixed liquid, and the solution of the oxidizing substance may be added to the mixed liquid.

The complex metal oxide powder obtained by the above-described method has the following features.

Since the complex metal oxide is amorphous, the complex metal oxide can be crystallized by heat treatment such as sintering. The crystallized complex metal oxide exhibits excellent crystallinity with a small amount of pyrochlore.

2. APPLICATION OF COMPLEX METAL OXIDE POWDER

A complex metal oxide powder is obtained by the manufacturing method according to this embodiment. The complex metal oxide powder may be directly sintered to form a crystallized complex metal oxide, or may be mixed with other complex metal oxide particles and sintered to form a crystallized complex metal oxide.

An application example of the complex metal oxide obtained according to this embodiment is described below. A method of forming bulk lead zirconate titanate using the alpha-PZTN powder obtained according to this embodiment is described below with reference to FIG. 1.

(1) Weighing and Mixing Raw Material

Figure 1:
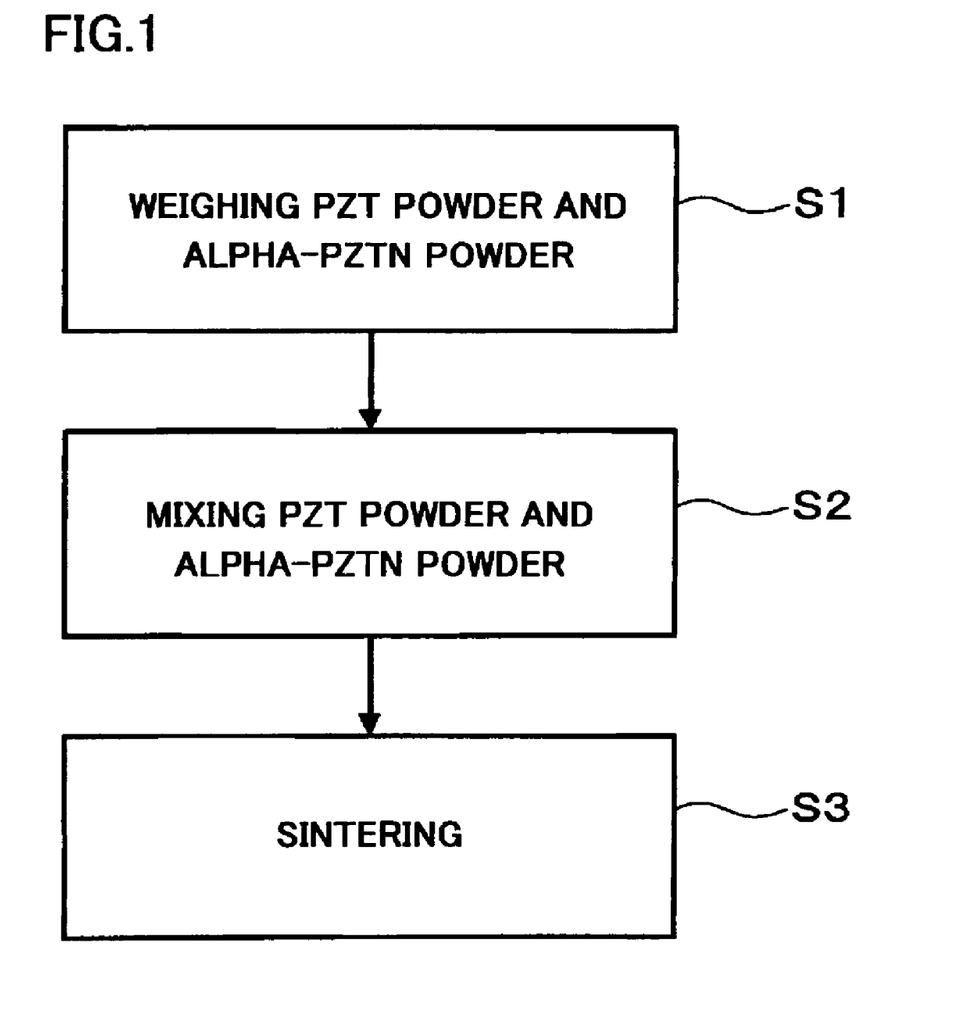
FIG. 1 is a flowchart showing a method of manufacturing bulk PZT.

Specific amounts of a lead zirconate titanate (Pb(Zr,Ti)O$_3$) (PZT) powder obtained by a sintering method or the like and the alpha-PZTN powder obtained according to this embodiment are weighed (step S1). The PZT powder and the alpha-PZTN powder are mixed to obtain a raw material powder (step S2). The particle diameters of the PZT powder and the alpha-PZTN powder are not particularly limited. For example, the particle diameters may be 1 micrometer to 100 micrometers.

The alpha-PZTN is used in an amount of 5 wt % to 25 wt % based on the raw material powder, for example. If the amount of the alpha-PZTN is within this range, a bulk PZT exhibiting excellent properties can be obtained without using an organic binder. Specifically, since the alpha-PZTN is in a state in which the atoms easily move (i.e. soft), the alpha-PZTN has a function of a binder for the PZT crystal powder. Since PZTN has a perovskite structure in the same manner as PZT, the alpha-PZTN is easily crystallized due to the crystallinity of PZT. Therefore, the sintering temperature can be reduced in comparison with the case of using only PZTN. Moreover, since PZTN exhibits excellent piezoelectric properties, ferroelectric properties, and insulating properties, PZTN can provide the bulk PZT with more excellent properties without adversely affecting the properties of the bulk PZT. When using an organic binder, it is difficult to completely remove the organic binder, whereby the bulk PZT may be affected. According to the above method, since the alpha-PZTN functions as a binder, such a problem does not occur.

(2) Sintering

The raw material powder is sintered. The raw material powder may be sintered using a known method. For example, the raw material powder may be placed in a die and sintered using a vacuum hot pressing method. The raw material powder may be sintered at 800 to 1200° C. A bulk PZT may be thus obtained.

According to the above method, a bulk PZT can be obtained without using an organic binder such as polyvinyl alcohol by using the raw material powder prepared by mixing the PZT powder and the alpha-PZTN powder. The bulk PZT exhibits excellent bulk crystal properties due to the absence of impurities such as an organic binder. Since the bulk PZT includes PZTN exhibiting excellent piezoelectric properties, ferroelectric properties, insulating properties, and the like, the bulk PZT exhibits excellent properties in comparison with PZT.

The bulk PZT may be used in various applications. For example, the bulk PZT may be suitably applied to a piezoelectric motor, a SAW device, a gyroscope, and the like.

3. EXAMPLES

Examples according to the invention are described below. Note that the invention is not limited to the following examples.

A sample of the example was obtained as follows.

(1) Example 1

An alpha-PZTN powder raw material composition was obtained by mixing first to third raw material solutions respectively containing at least one of Pb, Zr, Ti, and Nb, dimethyl succinate as a polycarboxylic acid ester, and n-butanol as an organic solvent. The mixed liquid was prepared by dissolving the sol-gel raw material and dimethyl succinate in n-butanol at a ratio of 1:1.

As the first raw material solution, a solution was used in which a polycondensation product for forming a PbZrO$_3$ perovskite crystal containing Pb and Zr was dissolved in n-butanol in an anhydrous state.

As the second raw material solution, a solution was used in which a polycondensation product for forming a PbTiO$_3$ perovskite crystal containing Pb and Ti was dissolved in n-butanol in an anhydrous state.

As the third raw material solution, a solution was used in which a polycondensation product for forming a $PbNbO_3$ perovskite crystal containing Pb and Nb was dissolved in n-butanol in an anhydrous state.

When forming a $PbZr_{0.33}Ti_{0.47}Nb_{0.2}O_3$ (PZTN) ferroelectric layer using the first, second, and third raw material solutions, the first raw material solution, the second raw material solution, and the third raw material solution are mixed at a ratio of 33:47:20. In order to reduce the crystallization temperature of the ferroelectric layer, a solution prepared by dissolving a polycondensate for forming a $PbSiO_3$ crystal in n-butanol in an anhydrous state was added to the above mixed liquid as a fourth raw material solution in an amount of 2 mol % to obtain a raw material composition.

An oxidizing solution was prepared by mixing a 30% hydrogen peroxide aqueous solution, a 20% aqueous ammonia, and pure water. The pH of the oxidizing solution was adjusted to 13. The oxidizing solution was mixed with the raw material composition in an amount of 600 vol %. As a result, particles were precipitated in the mixed liquid. The particles were collected and dried to obtain powder. The average particle diameter of the powder was about 100 micrometers. The resulting powder was analyzed by XRD to confirm that the powder was alpha-PZTN.

The alpha-PZTN powder was sintered at 600° C. to obtain crystallized PZTN. The XRD results of the crystallized PZTN are indicated by the symbol "c" in FIG. 2. As is clear from FIG. 2, it was confirmed that the PZTN obtained in this example had excellent crystallinity with a small amount of pyrochlore (indicated by P).

Figure 2:
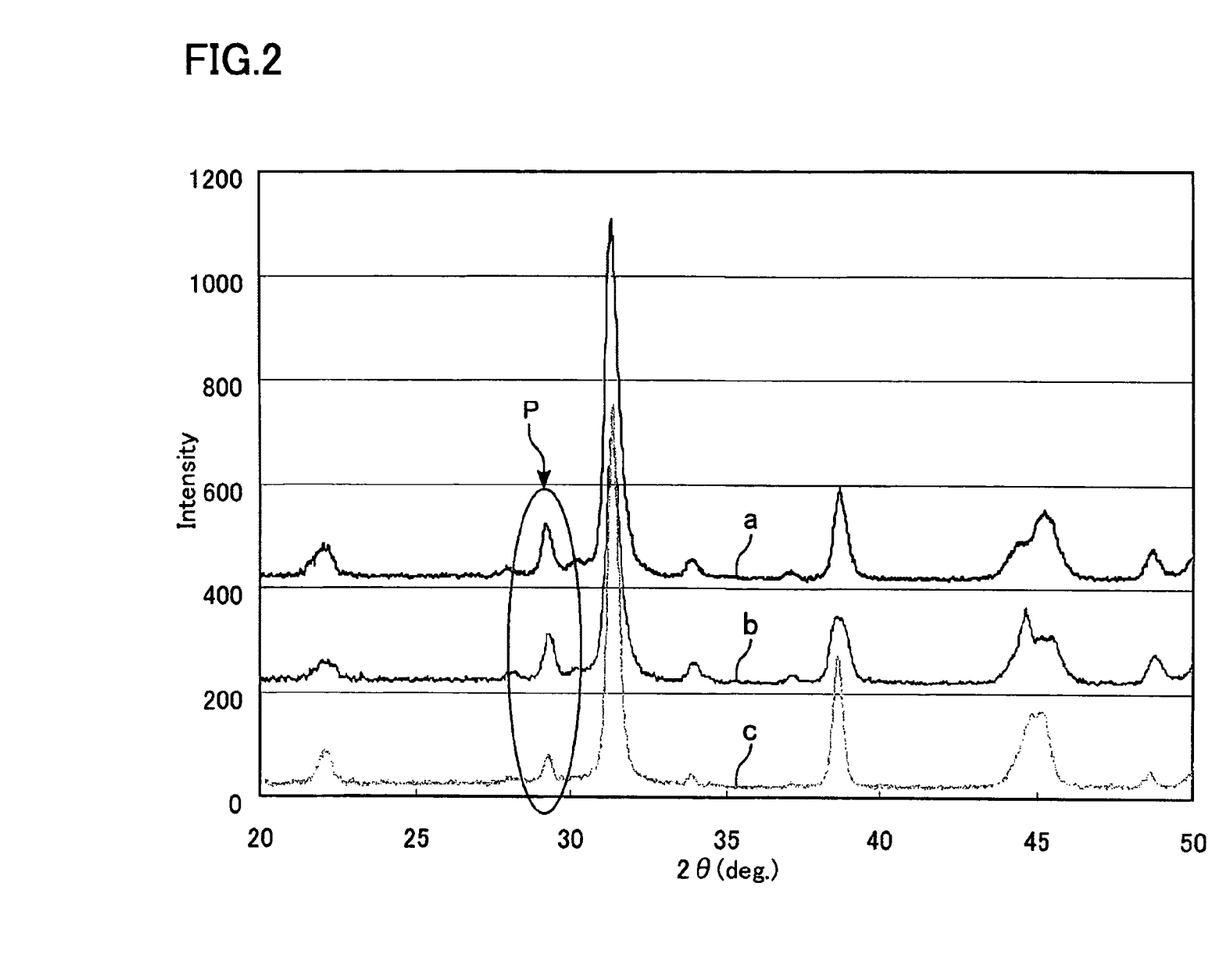
FIG. 2 is a graph showing XRD results of samples of Example 1.

A crystallized PZTN sample was obtained in the same manner as described above except for changing the pH of the oxidizing solution to 11 or 9. FIG. 2 shows the XRD results of these samples. The data indicated by the symbol "b" indicates the example in which the pH of the oxidizing solution is 11, and the data indicated by the symbol "a" indicates the example in which the pH of the oxidizing solution is 9. As is clear from FIG. 2, it was confirmed that the pyrochlore peak of the crystallized PZTN increases as the pH of the oxidizing solution decreases. This is estimated to be because diffusion of lead ions into the raw material composition is suppressed as the pH of the oxidizing solution becomes more alkaline, whereby production of pyrochlore due to lead is reduced.

(2) Example 2

Three types of alpha-PZTN were obtained using three types of oxidizing solutions in the same manner as in Example 1 except for changing the pH of the oxidizing solution to about 10 by changing the amounts of hydrogen peroxide and ammonia in the oxidizing solution and changing the amount of the oxidizing solution added. A 30% hydrogen peroxide aqueous solution and a 29% aqueous ammonia were used.

A first oxidizing solution was prepared by mixing the hydrogen peroxide solution and the ammonia solution at ratio of about 1:2.5, and the pH of the solution was adjusted to about 10 by adding pure water. A second oxidizing solution was prepared by mixing the hydrogen peroxide solution and the ammonia solution at ratio of about 2:1, and the pH of the solution was adjusted to about 10 by adding pure water. A third oxidizing solution was prepared by mixing the hydrogen peroxide solution and the ammonia solution at ratio of about 3:1, and the pH of the solution was adjusted to about 10 by adding pure water.

The oxidizing solution was added to the raw material composition in an amount of about 230 vol % in the same manner as in Example 1. As a result, a powder was precipitated in the mixed liquid. The resulting powder was analyzed by XRD to confirm that the powder was alpha-PZTN.

Figure 3:
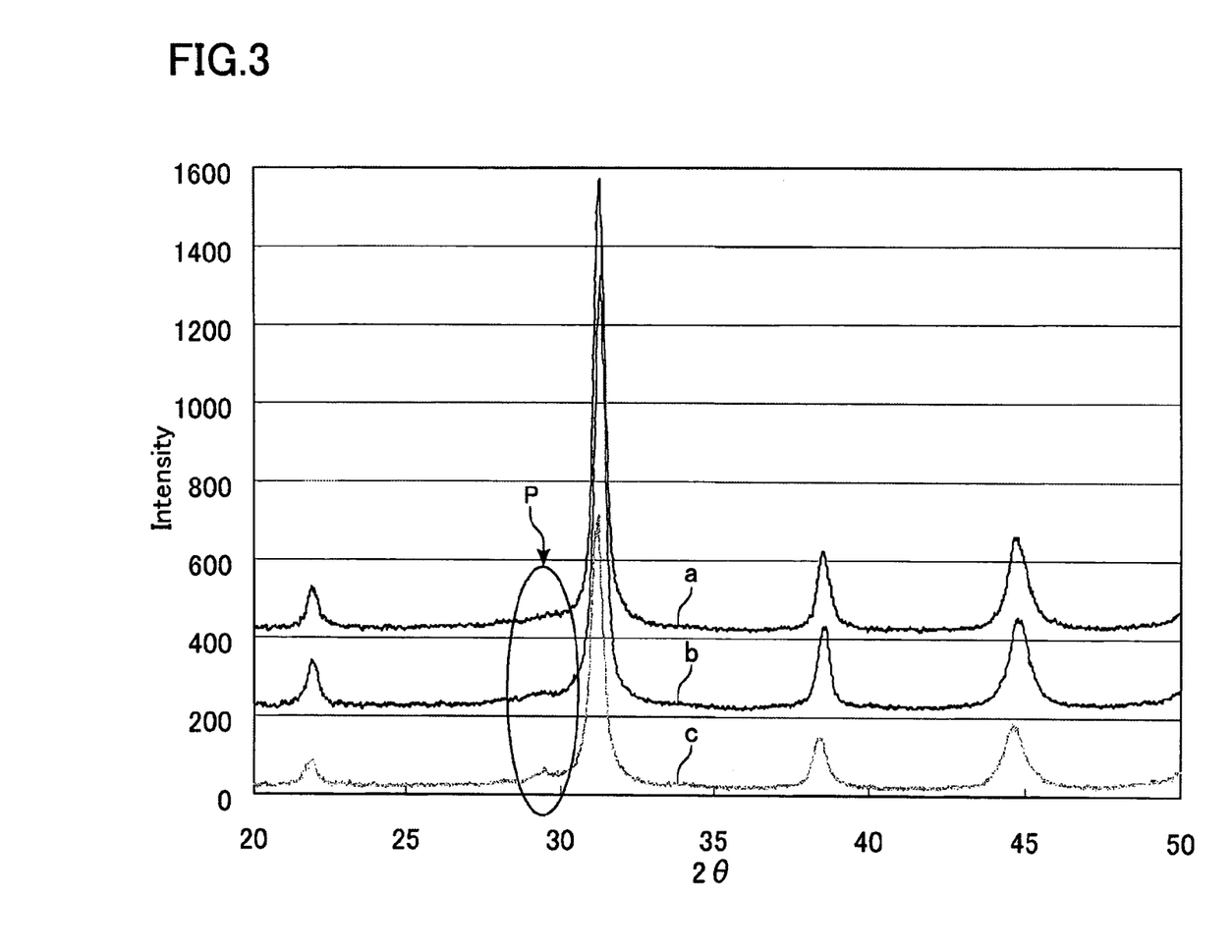
FIG. 3 is a graph showing XRD results of samples of Example 2.

The alpha-PZTN powder was sintered at 600° C. in the same manner as in Example 1 to obtain a crystallized PZTN sample. Each sample was analyzed by XRD to obtain the results shown in FIG. 3. In FIG. 3, the data indicated by the symbol "a" indicates the case of using the first oxidizing solution, the data indicated by the symbol "b" indicates the case of using the second oxidizing solution, and the data indicated by the symbol "c" indicates the case of using the third oxidizing solution. The peak indicated by the symbol P is the pyrochlore peak.

As is clear from FIG. 3, it was found that the pyrochlore peak increases as the amount (percentage) of hydrogen peroxide increases. This is estimated to be because diffusion of lead ions into the raw material composition increases as the amount of hydrogen peroxide increases, whereby production of pyrochlore increases.

The invention is not limited to the above-described embodiments, and various modifications can be made. For example, the invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

What is claimed is:

1. A method of manufacturing a complex metal oxide powder, the method comprising:
  preparing a raw material composition for forming a complex metal oxide;
  mixing an oxidizing solution including an oxidizing substance into the raw material composition to produce complex metal oxide particles to obtain a liquid dispersion of the particles; and
  separating the particles from the liquid dispersion to obtain a complex metal oxide powder;
  the complex metal oxide being shown by a general formula $AB_{1-x}C_xO_3$, the element A including at least Pb, the element B including at least one of Zr, Ti, V, W, or Hf, and the element C including at least one of Nb or Ta; and
  the raw material composition including:
  at least one of a thermally-decomposable organometallic compound, a hydrolyzable organometallic compound or a partial hydrolyzate and/or a polycondensate of the hydrolyzable organometallic compound, at least one of the thermally-decomposable organometallic compound or the hydrolyzable organometallic compound including the element A and the element B or C;
  at least one of a polycarboxylic acid or a polycarboxylic acid ester; and
  an organic solvent,
  wherein the oxidizing solution is obtained by mixing a solution of an oxidizing substance and a solution of an alkaline substance.

2. The method of manufacturing a complex metal oxide powder as defined in claim 1, wherein the complex metal oxide is lead zirconate titanate niobate in which the element B is Zr and Ti and the element C is Nb.

3. The method of manufacturing a complex metal oxide powder as defined in claim 1, wherein the organic solvent is an alcohol.

4. The method of manufacturing a complex metal oxide powder as defined in claim 2, wherein the lead zirconate titanate niobate is shown by a formula $Pb(Zr,Ti)_{1-x}Nb_xO_3$ in which $0.05 \leqq x \leqq 0.3$.

5. The method of manufacturing a complex metal oxide powder as defined in claim 2, wherein the lead zirconate titanate niobate further includes silicon or silicon and germanium in an amount of 0.5 mol % or more.

6. The method of manufacturing a complex metal oxide powder as defined in claim 1, wherein the pH of the oxidizing solution is adjusted to more than 7 and 13 or less.

7. The method of manufacturing a complex metal oxide powder as defined in claim 6, wherein the pH of the oxidizing solution is adjusted to 10 or more and 13 or less.

8. The method of manufacturing a complex metal oxide powder as defined in claim 6, wherein the pH of the oxidizing solution is adjusted to 10 or more and 11 or less.

9. The method of manufacturing a complex metal oxide powder as defined in claim 1, wherein the oxidizing substance is hydrogen peroxide.

10. The method of manufacturing a complex metal oxide powder as defined in claim 1, wherein the complex metal oxide is amorphous.

* * * * *